(12) United States Patent (10) Patent No.: US 8,032,478 B2
Mihalkova et al. (45) Date of Patent: *Oct. 4, 2011

(54) MODIFICATION OF RELATIONAL MODELS

(75) Inventors: Lilyana Simeonova Mihalkova, Austin, TX (US); Matthew Richardson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,225

(22) Filed: Oct. 28, 2010

(65) Prior Publication Data

US 2011/0040721 A1 Feb. 17, 2011

Related U.S. Application Data

(63) Continuation of application No. 12/017,048, filed on Jan. 21, 2008, now Pat. No. 7,849,025.

(51) Int. Cl.
*G06F 9/44* (2006.01)
*G06N 7/02* (2006.01)
*G06N 7/06* (2006.01)

(52) U.S. Cl. ........................................................ 706/52

(58) Field of Classification Search ...................... 706/52
See application file for complete search history.

(56) References Cited

U.S. PATENT DOCUMENTS

| | | | |
|---|---|---|---|
| 6,380,934 B1 | 4/2002 | Freeman et al. | |
| 6,745,157 B1 | 6/2004 | Weiss et al. | |
| 7,120,619 B2 | 10/2006 | Drucker et al. | |
| 7,149,649 B2 | 12/2006 | Haft et al. | |
| 7,599,947 B1 | 10/2009 | Tolbert | |
| 7,849,025 B2 * | 12/2010 | Mihalkova et al. | 706/12 |
| 2005/0278357 A1 | 12/2005 | Geoffrey et al. | |
| 2007/0168329 A1 | 7/2007 | Haft et al. | |

FOREIGN PATENT DOCUMENTS

WO 2004049191 A2 6/2004

OTHER PUBLICATIONS

Culotta, et al., "Practical Markov Logic Containing First-Order Quantifiers with Application to Identity Uncertainty", Date: Sep. 8, 2005, pp. 1-11.
Domingos, et al., "Markov Logic: A Unifying Framework for Statistical Relational Learning", pp. 1-6.
Kok, et al., "Learning the Structure of Markov Logic Networks", Date: 2005, pp. 1-8.
Lowd, et al., "Efficient Weight Learning for Markov Logic Networks", pp. 1-12.
Richardson, et al., "Markov Logic Networks", Date: Jan. 26, 2006, pp. 1-44.
Chiu, et al. "An Exploration of Relationships Among Exclusive Disnjunctive Data", Knowledge and Data Engineering, IEEE Transactions on vol. 7, Issue 6. Digital Object Identifier: 10.1109/69.476498. Publication Year: 1995, pp. 928-940.

(Continued)

*Primary Examiner* — Michael B Holmes

(57) ABSTRACT

Described herein is a system that facilitates modifying a relational model. The relational model is modified based at least in part upon an identity of a user, and the modified relational model is used to predict queries or advertisements that are of interest to the user. Examples of relational models that are modifiable include a Markov Logic Network, a probabilistic relational model, a BLOG relational model, a structural logistic regression relational model, a relational dependency network, or a probabilistic entity relationship model.

20 Claims, 10 Drawing Sheets

OTHER PUBLICATIONS

Kisworo, et al., "Implementation of an Object-Oriented Front-end to a Relational Database System"; TENCON 90. 1990 IEEE Region 10 Conference on Computer and Communication Systems. Digital Object Identifier 10.1109/TENCON.1990.152725. Publication Year: 1990, pp. 811-815, vol. 2.

Chung, et al., "Integration of a Relational Database with Multimedia Data", Computer Software and Applications Conference, 1996, COMPSAC '96. Proceedings of 20th International. Digital Object Identifier: 10.1109/CMPSAC.1996.544179. Publication Year: 1990, pp. 290-297.

Ping, "High Resolution Radar Target Structure Description Using Modified Prony Model", Aerospace and Electronics Conference, 1996. NAECON 1996., Proceedings of the IEEE 1996 National Vol. 1. Digital Object Identifier: 10.1109/NAECON.1996.517648. Publication Year: 1996, pp. 231-236, vol. 1.

* cited by examiner

MODIFICATION OF RELATIONAL MODELS

RELATED APPLICATION

This application is a continuation of U.S. patent application Ser. No. 12/017,048, filed on Jan. 21, 2008, and entitled "MODIFICATION OF RELATIONAL MODELS", the entirety of which is incorporated herein by reference.

BACKGROUND

Machine learning uses computational and statistical methods to enable a computer to "learn" from a set of data. Conventional machine learning involves learning a mapping from a feature or list of features to a class or value. More specifically, an item typically has a feature or set of features associated therewith, and such feature or set of features can be analyzed to determine what class or value to assign to an item. Pursuant to an example, it may be desirable to learn a function that determines whether or not a mushroom is poisonous and/or determines a probability that the mushroom is poisonous. The features of mushrooms that can be identified include size, shape, color, location where the mushroom is growing, amongst others. Given sufficient data regarding mushrooms, an algorithm can be learned that can map a mushroom (with certain features) to a class (poisonous or non-poisonous) or output a value (a probability that the mushroom is poisonous).

Relational machine learning is a relatively new area of machine learning. In relational machine learning, relationships (either defined or learned) are taken into consideration. More specifically, relationships between items that inference is desirably performed upon are considered. In an example, a university department may include students that get grades, professors that give grades, courses that students take and professors teach, and publications, where these items are all related. In an example, it may be desirable use relational machine learning to determine a quality of each teacher. To make such determination, it may be desirable to review grades that students received in different courses taught by different professors. This may be used to determine quality of each student, wherein there is a relationship between quality of students and quality of professors. In relational machine learning, inference can be performed at substantially similar times for quality of students and for quality of teachers. Because relationships can be defined and inference can be performed over relationships at substantially similar times, relational machine learning is a powerful tool.

An example structure that can be used in connection with relational machine learning is a Markov Logic Network (MLN). A MLN is a general model that can be used to represent statistical dependencies in a relational domain, and have been applied to applications where the task is to predict the probability that two entities are in a particular relationship. For instance, a MLN can be used to determine that two records in a database refer to a substantially similar entity. While MLNs and other relational models can be used effectively to predict or estimate relationships, due to their complexity a substantial amount of time may be required to perform inference over one or more objects or relationships. Accordingly, relational machine learning is inefficient when complex or numerous relationships exist in data.

SUMMARY

The following is a brief summary of subject matter that is described in greater detail herein. This summary is not intended to be limiting as to the scope of the claims.

Various technologies relating to reducing time typically associated with performing inference over relational models are described in detail herein. A computer-implemented relational model can be modified to reduce time typically associated with performing inference over relational models. For instance, atoms in a relational model can be automatically assigned probabilities based at least in part upon probabilities computed for other atoms. In another example, atoms can be selectively removed from the relational model. In still yet another example, relationships between atoms can be selectively ignored or culled from the relational model.

In an example, atoms of a computer-implemented relational model can be selectively clustered. The clustering can be based at least in part upon signatures assigned to atoms, wherein atoms with substantially similar signatures can be placed in a same cluster. Thereafter, inference can be performed on one or more representative atoms in a cluster, and values can be assigned to other atoms in the cluster based at least in part upon results from the inference. For example, performing inference on an atom can result in computing a probability for the atom. For instance, the probability may be a probability that the atom should be labeled as "true." In an example, the computed probability may be used to assign a value (e.g., probability) to other atoms in the cluster of atoms. Therefore, in a particular example, inference may only be performed once, yet a result of the inference may be used to assign values to several different atoms.

The systems and methods described herein may be used, for example, in connection with a search engine to aid in predicting queries that are of interest to users and/or to predict advertisements that are of interest to users. Furthermore, the systems and methods described in detail below may be used in a portable computing device. Still further, modification of a relational model may be used to parameterize the relational model (e.g., assign weights to first order clauses in the relational model).

Other aspects will be appreciated upon reading and understanding the attached figures and description.

DETAILED DESCRIPTION

Figure 1:
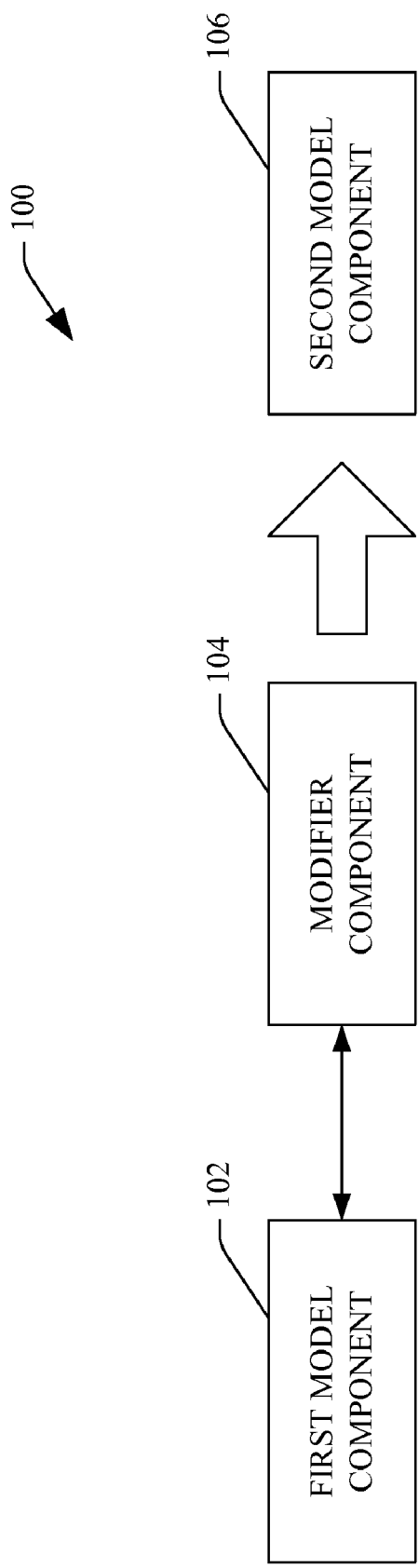
FIG. 1 is a functional block diagram of an example system that facilitates modifying a relational model.

Various technologies pertaining to relational models will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates modifying a relational model to reduce an amount of time to perform inference over the relational model is illustrated. The system 100 includes a first model component 102. A modifier component 104 modifies the first model component 102 to create a second model component 106. The first model component 102 can be a computer-implemented relational model, wherein the relational model may include, for example, atoms and relationships. For instance, relationships may be implemented as first order weighted clauses. An atom can be a statement about a thing or things, such as "X is a man", "Y is the daughter of X", "Z is married to X", etc. The first model component 102 can be or include a Markov Logic Network, a probabilistic relational model, a BLOG relational model, a structural logistic regression relational model, a relational dependency network, and/or a probabilistic entity relationship model. Other relational models are also contemplated and are intended to fall under the scope of the hereto-appended claims.

The modifier component 104 can alter the first model component 102 to reduce an amount of time needed to perform inference over the first model component 102. The term "inference" as used herein refers to the act of deriving logical conclusions (e.g., computing one or more values) from premises that are known or assumed to be true. For example, the first model component 102 may be or include a relational model that can be represented by a graphical structure. For instance, the first model component 102 may be computer-implemented code that can be represented by a graph that includes nodes and edges, wherein the nodes can represent, for example, entities that may or may not be related, and edges represent relationships between the nodes. For example, the first model component 102 may be used to predict what queries would be of interest to a user. Accordingly, nodes may represent queries and/or users and edges can represent relationships between the queries and users. In a particular example, the modifier component 104 can cluster similar nodes and assign a single value to all nodes in a cluster. In another example, the modifier component 104 can remove nodes and/or edges from the first model component 102 to create the second model component 106. Inference may then be performed over the second model component 106 to obtain a classification or value of interest.

Pursuant to a particular example, the first model component 102 may be or include a Markov Logic Network, which includes first order logic clauses that have weights assigned thereto, wherein the clauses capture general dependencies in a domain covered by the Markov Logic Network and a weight is indicative of importance that a dependency captured by the clause should hold. The weights can be learned or assigned by a programmer, for example. In another example, the first order logic clauses can be coded and the weights can be learned from data. Once the Markov Logic Network is coded and the weights are learned, the Markov Logic Network can be used to infer probabilities about relationships among entities. For instance, a Markov Logic Network can model interactions between people in a company and be configured to predict a probability that any given pair of people is in a manager/subordinate relationship. Markov Logic Networks are generally described in the following publication, the entirety of which is incorporated herein by reference: Richardson, M. and Domingos, P. "Markov Logic Networks" Machine Learning, 62, pp 107-136.

In Markov Logic Networks, a "term" can be an expression representing an object in a domain of interest, and can be a constant, a variable, or a function applied to a tuple of terms. An "atom" is a predicate symbol that is applied to a tuple of terms, and formulas can be constructed from atomic formulas using logical connectives and quantifiers. A "ground term" is a term that does not include variables, and a "ground atom" is an atomic formula, wherein each argument of the atomic formula is a ground term.

In an example, when inference is performed on a Markov Logic Network, the probability of a particular atom being true (e.g., assigned a value of one) is affected by weights of the clauses that include the atom and are not satisfied by given evidence (known facts/data). Clauses that include atoms that are not satisfied by given evidence can be referred to as "unsatisfied clauses." Furthermore, in Markov Logic Networks, if two atoms do not participate together in a single unsatisfied clause, the atoms are independent of one another. As referred to above, the modifier component 104 can selectively remove atoms, assign probabilities to atoms or clauses, cluster atoms, and/or the like.

Figure 2:
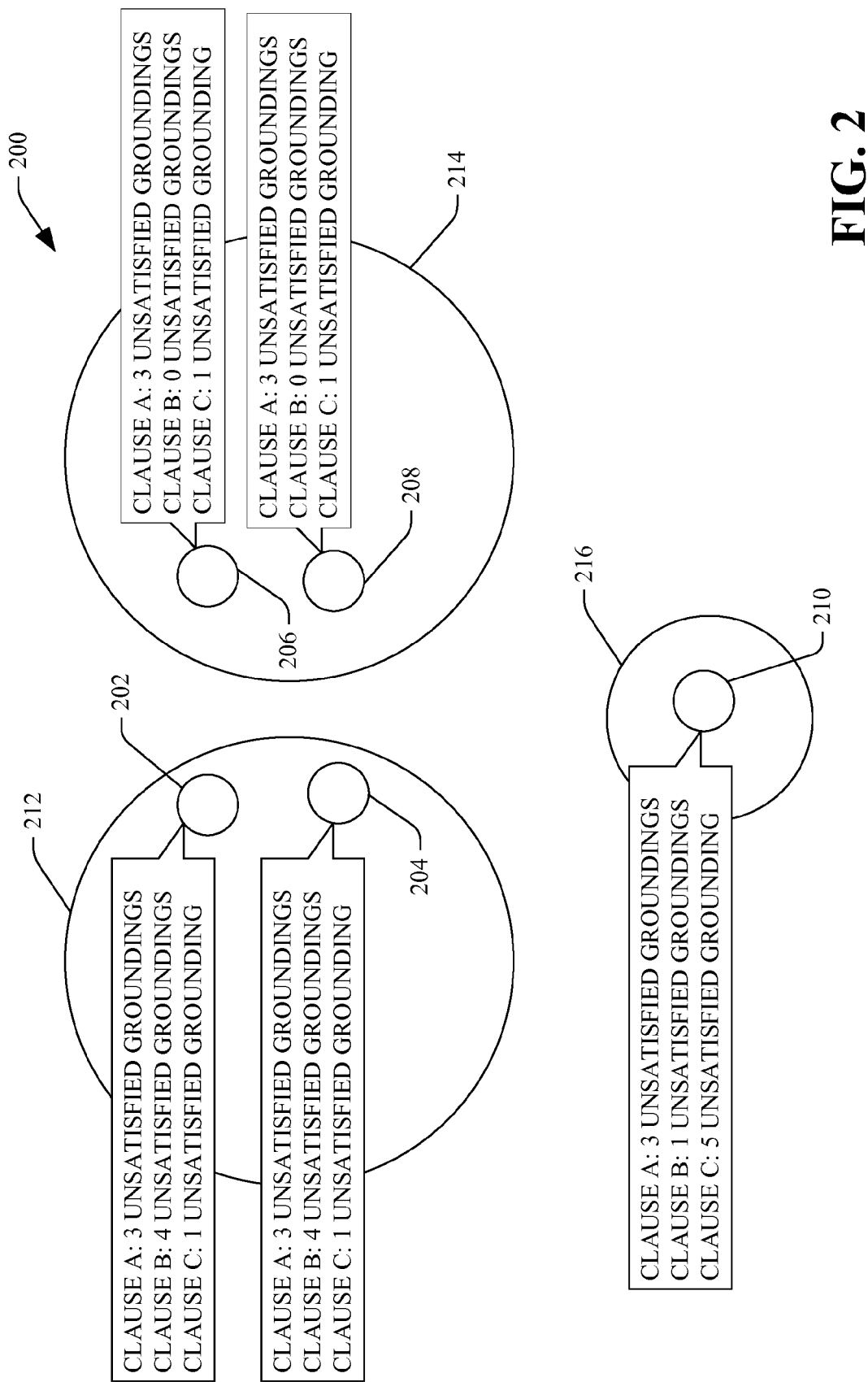
FIG. 2 is a graphical depiction of an example relational model.

Now referring to FIG. 2, an example graphical illustration of a relational model 200 is depicted. In this example, the relational model is a Markov Logic Network. It is to be understood, however, that other types of relational models are contemplated. The relational model 200 includes atoms 202, 204, 206, 208, and 210, all of which are independent of one another (e.g., the atoms 202-210 do not participate together in an unsatisfied clause). It can be discerned that, because the probability corresponding to an atom depends on weights of unsatisfied clauses in which it participates, if two atoms participate in a same number of unsatisfied clauses with a particular weight, then when inference is performed the probability can be used to assign probabilities to other atoms (e.g., atoms can be assigned a substantially similar probability as the probability corresponding to the aforementioned atom).

With more specificity, the modifier component 104 (FIG. 1) can cluster atoms into multiple clusters, wherein substantially similar probabilities would result from performing inference on the atoms in a cluster. In this example, atoms 202 and 204 are clustered together in cluster 212, atoms 206 and 208 are clustered together in cluster 214, and atom 210 is in cluster 216. The modifier component 104 can then perform inference on one or more representative atoms in a cluster to determine individually determine values (e.g., probabilities), and can assign values to other atoms in the same cluster based at least in part upon the determined value(s). In an example, the modifier component 104 can perform inference on a representative atom in a cluster to determine a probability, and can assign that probability to other atoms in the same cluster. Therefore, for instance, the modifier component 104 can perform inference on the atom 202 to determine a value, and then assign a value to the atom 204 based at least in part upon the determined value for the atom 202 (without performing inference on the atom 204).

In another example, a cluster may include numerous atoms (e.g., hundreds of atoms), and inference may be performed over a subset of such atoms (e.g., ten atoms) such that values (e.g., probabilities of being "true") are determined for each of the subset of atoms. The distribution of values may be analyzed, and such distribution may be used to assign values to other atoms in the cluster. For example, an average probability determined for ten atoms in the cluster may be 0.3, and the variance may be 0.1. The modifier component 104, for instance, may assign values such as 0.25, 0.2, 3.5, 3.2, etc. to other atoms in the cluster (based upon the average probability and the variance). Other manners for using determined values of one or more atoms to assign values to other atoms in a cluster are contemplated and are intended to fall under the scope of the hereto-appended claims.

In general, for each atom, the modifier component 104 can determine a number of unsatisfied groundings that include the atom for each clause in the Markov Logic Network. For instance, with respect to the atom 202, there are three unsatisfied groundings that include the atom 202 for a first clause (clause A), four unsatisfied groundings that include the atom 202 for a second clause (clause B), and one unsatisfied grounding that includes the atom 202 for a third clause (clause C). It can be discerned that the atom 204 is associated with a same count as the atom 202 (three unsatisfied groundings that include the atom 204 for the first clause, four unsatisfied groundings that include the atom 204 for the second clause, and one unsatisfied grounding that includes the atom 204 for the third clause). The modifier component 104 can cluster atoms that have equivalent counts corresponding thereto. Thus, the atom 202 and the atom 204 are clustered together in cluster 212. The modifier component 104 may then perform inference on a subset of atoms in the cluster to determine one or more values (e.g., probabilities). For instance, the modifier component 104 may perform inference on one representative atom (e.g., atom 202) to determine a probability that can be assigned to the atom. Continuing with this example, the modifier component 104 may then assign the determined probability to each atom in the cluster. For example, the modifier component 104 can assign the probability determined by performing inference on the atom 202 to the atom 204.

Figure 3:
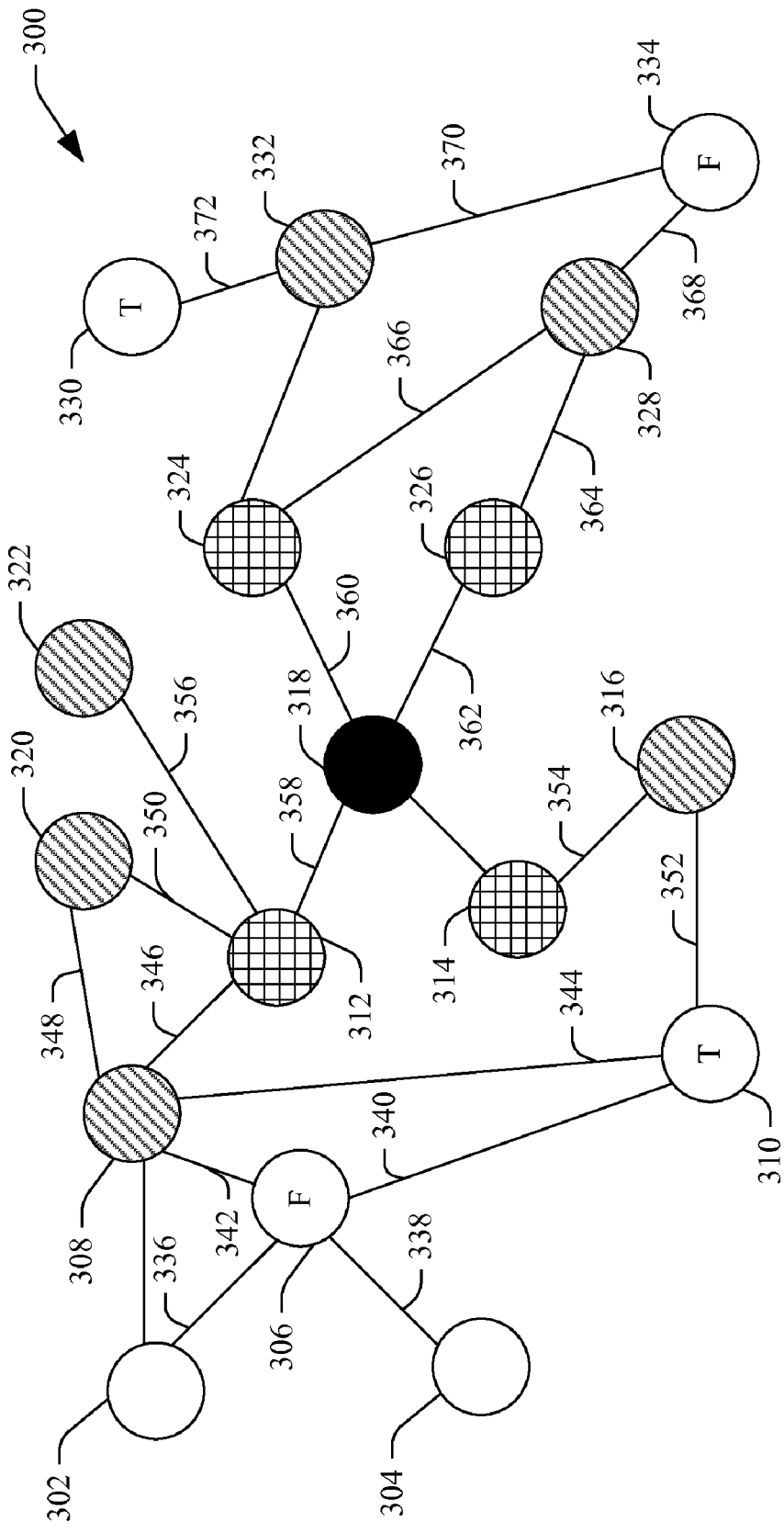
FIG. 3 is a graphical depiction of an example relational model.

Turning now to FIG. 3, an example graphical depiction of a relational model 300 is illustrated. In this example, the relational model can be a Markov Logic Network, although other relational models are contemplated. The depicted relational model 300 includes unsatisfied clauses that include more than one atom—therefore, in this example, the atoms are not independent of one other. Accordingly, the modifier component 104 can take into consideration dependencies of atoms when clustering atoms, for example. In the graphical depiction, atoms that are dependent upon one another are connected by edges.

The relational model 300 includes atoms 302-334 and edges 336-372. For instance, the edge 370 indicates that the atoms 332 and 334 are dependent upon one another. In this example, it is desirable to determine a probability for the atom 318. To determine such probability, the modifier component 104 can, for each atom, expand the neighborhood around the atom to a particular depth, wherein depth refers to distance in relationships between atoms. For instance, if the neighborhood of atom 318 is expanded by one, then atoms 312, 314, 324, and 326 would be included in the neighborhood. If the neighborhood of atom 318 is expanded by two, then the aforementioned four atoms and atoms 328, 332, 322, 320, 308, and 316 would be included in the neighborhood. Still further, if the neighborhood of atom 318 is expanded by three, the neighborhood would include the aforementioned ten atoms as well as atoms 330, 334, 306, and 310.

The modifier component 104 may then "cut off" a remainder of the network by assigning most likely values (or default values) to atoms at the periphery of the neighborhood. For instance, if the neighborhood of atom 318 was expanded by three, then the modifier component 104 can assign most likely values (e.g., true or false) to atoms 306, 310, 330, and 334 (effectively "cutting off" atoms 302 and 304 to create a sub-network). The modifier component 104 may then compute a "signature" for the atom 318 by recursively clustering atoms in the neighborhood. The modifier component 104 may then cluster atoms with equal signatures, and perform inference on a subset of atoms of each cluster in the sub-network used to calculate the signature. In an example, the modifier component 104 may perform inference on a single atom in each cluster in the sub-network to compute a probability and assign the computed probability to each atom in the cluster.

In an example, as noted above, the modifier component 104 assigns most likely or default values to atoms 306, 310, 330, and 334. Once such values are assigned, the modifier component 104 can compute signatures (e.g., cluster values) for atoms 308, 316, 320, 322, 328, and 332. Based at least upon such computed signatures, the modifier component 104 can compute signatures for atoms 312, 314, 324, and 326. Based upon such signatures, the modifier component 104 can compute a signature for the atom 318. A signature can be computed for each atom in the relational model 300, and the modifier component 104 can cluster together atoms with substantially similar signatures. As noted above, once the atoms are clustered by signature, inference need not be performed on each atom in the cluster. Rather, inference can be performed on one or more atoms from such cluster to output one or more values, and these one or more values can be used to assign values to other atoms in the cluster.

Figure 4:
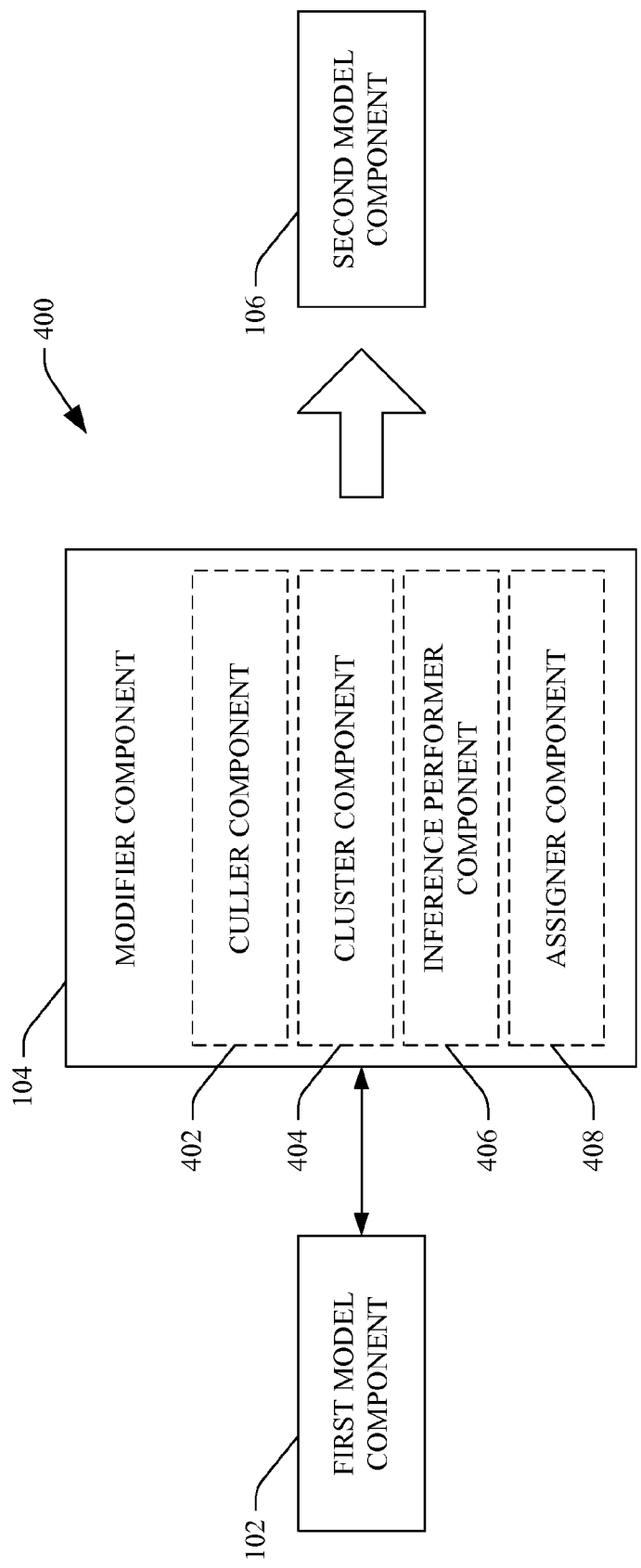
FIG. 4 is a functional block diagram of an example system that facilitates modifying a relational model.

With reference now to FIG. 4, an example system 400 that facilitates modifying a relational model is illustrated. The system 400 includes the first model component 102, the modifier component 104, and the second model component 106. As described above, the modifier component 104 modifies the first model component 102 to create the second model component 106. In an example, the second model component 106 can be stored in memory space that was previously used to store at least a portion of the first model component 102.

The modifier component 104 may include a culler component 402, a cluster component 404, an inference performer component 406, and an assigner component 408. The culler component 402, for instance, can remove atoms from consideration by assigning most likely or default values to certain atoms in a relational model (e.g., a Markov Logic Network). In another example, the culler component 402 can remove atoms from a network that will have little impact on a desired output. In still yet another example, the culler component 402 can remove relationships from between atoms, wherein the relationship will have little impact on a desired output. For instance, the first model component 102 may be or include a relational model that is configured to determine a probability that a professor advises a particular student. Geographic location that a student lives on campus may have little impact or relevance on whether a certain professor advises the student. Accordingly, the culler component 402 can remove atoms that require such information from the first model component 102.

The cluster component 404 can recursively cluster neighbors of a particular atom in the first model component 102 to compute a signature for the particular atom. Such recursive clustering has been described in detail above. Furthermore, the cluster component 404 can cluster atoms that have substantially similar or equal signatures. The inference performer component 406 can perform inference on representative atoms in clusters to determine values, such as probabilities. For example, the inference performer component 406 can perform inference on a single atom from a cluster of atoms and determine a probability for such atom. Continuing with the example, the assigner component 408 may then assign the probability to each atom in the cluster. The modified relational model may then be output by the modifier component as the second model component 106.

Figure 5:
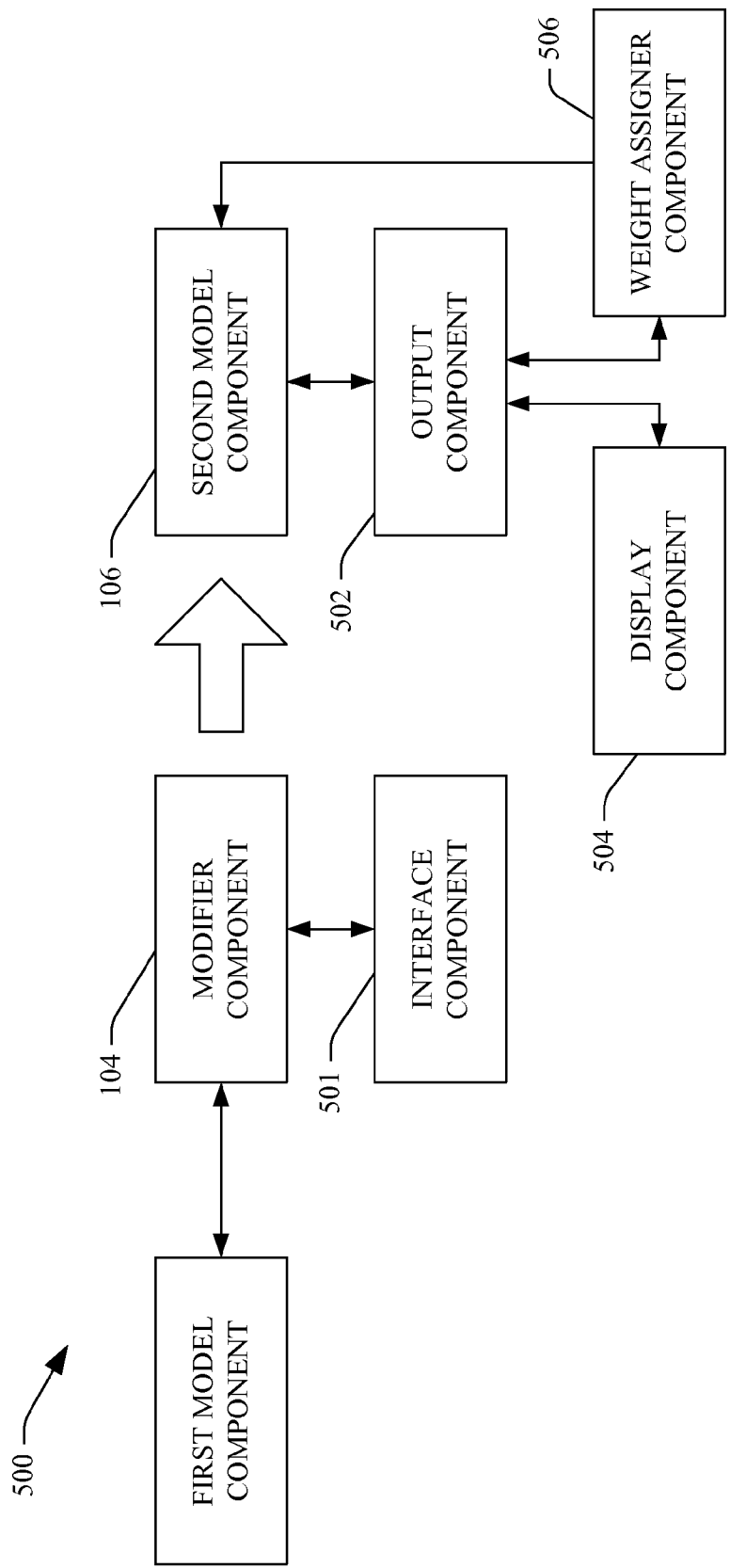
FIG. 5 is a functional block diagram of an example system that facilitates outputting a value in response to performing inference over a relational model.

Now referring to FIG. 5, an example system 500 that facilitates modifying a relational model is illustrated. The system 500 includes the first model component 102 and the modifier component 104, wherein the modifier component 104 modifies the first model component 102 to create the second model component 106 as described above. The system 500 further includes an interface component 501 that receives user input, such as data that can be used to identify a user. The modifier component 104 can use the user input to modify the first model component 102. For instance, the structure of the first model component 102 may depend on the identity of the user, and the modifier component 104 can modify the first model component 102 based at least in part upon such information.

The system 500 further includes an output component 502 that can receive a request and use the second model component 106 to output information in response to the request. For example, the second model component 106 may be configured to predict queries that would be of interest to a particular user. The output component 502 may receive a request to output queries that are predicted to be of interest to the certain user. The output component 502 can access the second model component 106 with information pertaining to the request and perform inference over the second model component 106 to output queries that are predicted to be of interest to the user. For example, the output component 502 can output a subset of queries with a highest probability assigned thereto. A display component 504 can display data output by the output component 502. For instance, the display component 504 can configure information that is to be displayed to a user on a web page.

In another example, the output component 502 can output information to a weight assigner component 506, which can parameterize the second model component 106 by assigning weights thereto. For instance, the weight assigner component 506 can assign weights to clauses of the second model component 106. The weight assigner component 506 can use any suitable mechanism for parameterizing the second model component 106, including monitoring output of the second model component 106 and human responses to such output.

With reference now to FIGS. 6-9, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. In addition, methodologies may be used herein in connection with a portable computing device.

Figure 6:
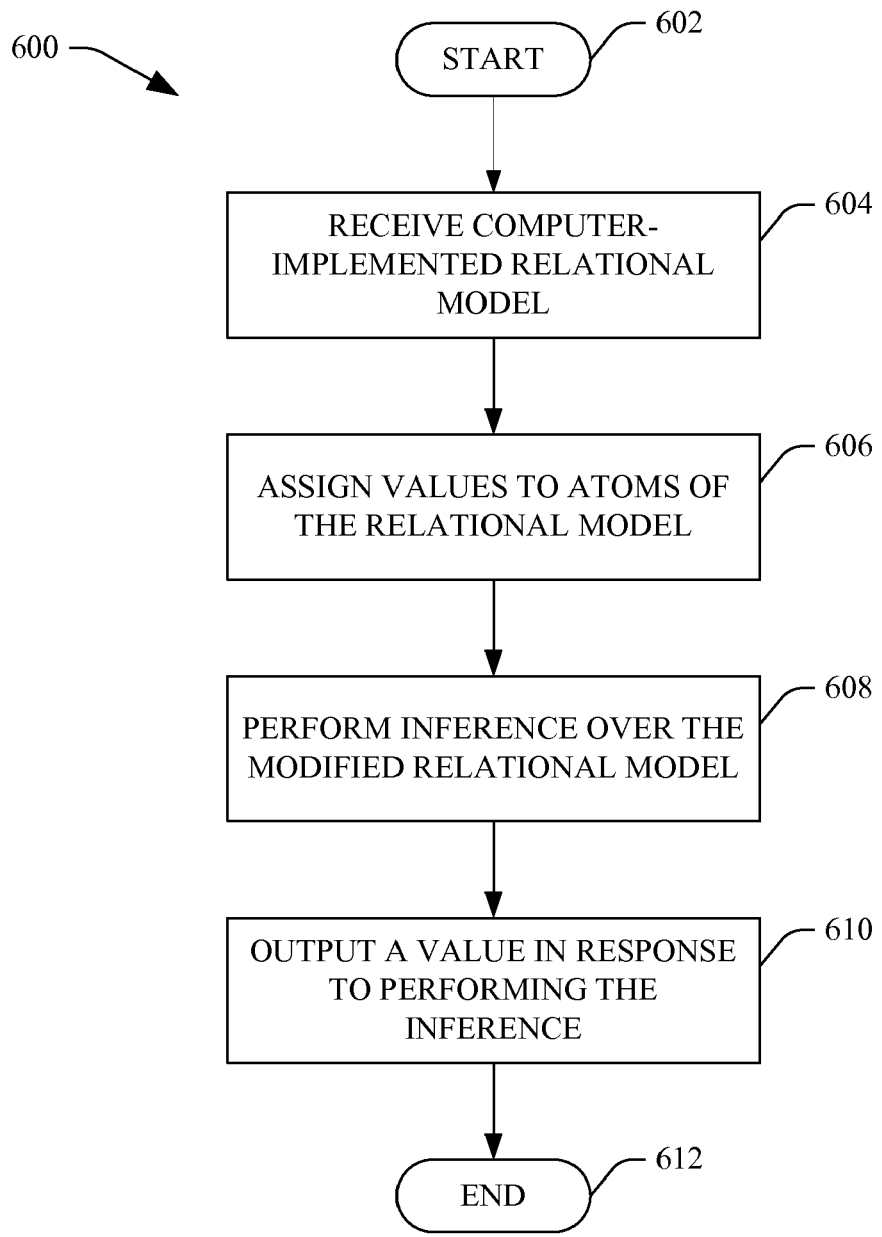
FIG. 6 is a flow diagram that illustrates an example methodology for modifying a relational model.

Referring specifically to FIG. 6, an example methodology 600 for modifying a relational model is illustrated. The methodology 600 starts at 602, and at 604 a computer-implemented relational model is received. For instance, the relational model may be or include a Markov Logic Network, a probabilistic relational model, a BLOG relational model, a structural logistic regression relational model, a relational dependency network, a probabilistic entity relationship model, and/or another suitable relational model. In an example, the relational model can be depicted graphically, wherein the graph includes nodes and edges. In an example, the nodes can represent atoms in a Markov Logic Network and edges can represent relationships between the atoms.

At 604, the relational model is automatically modified by selectively removing atoms from the relational model. In an example, probabilities can be assigned to each atom in the relational model, wherein assignment of probabilities to atoms can effectively cull less relevant atoms from the relational network.

At 606, inference is performed over the modified relational model, wherein the inference is performed in response to a request. The request can be for a probability of the existence of a certain relationship between entities. For example, the relationship may be between queries and users (e.g., what queries will be of interest to a user). At 608, a value is output in response to performing the inference. The value may be, for instance, a probability that the user will be interested in a particular query. In another example, the value may be used to weight clauses in the relational model. The methodology 600 completes at 610.

Figure 7:
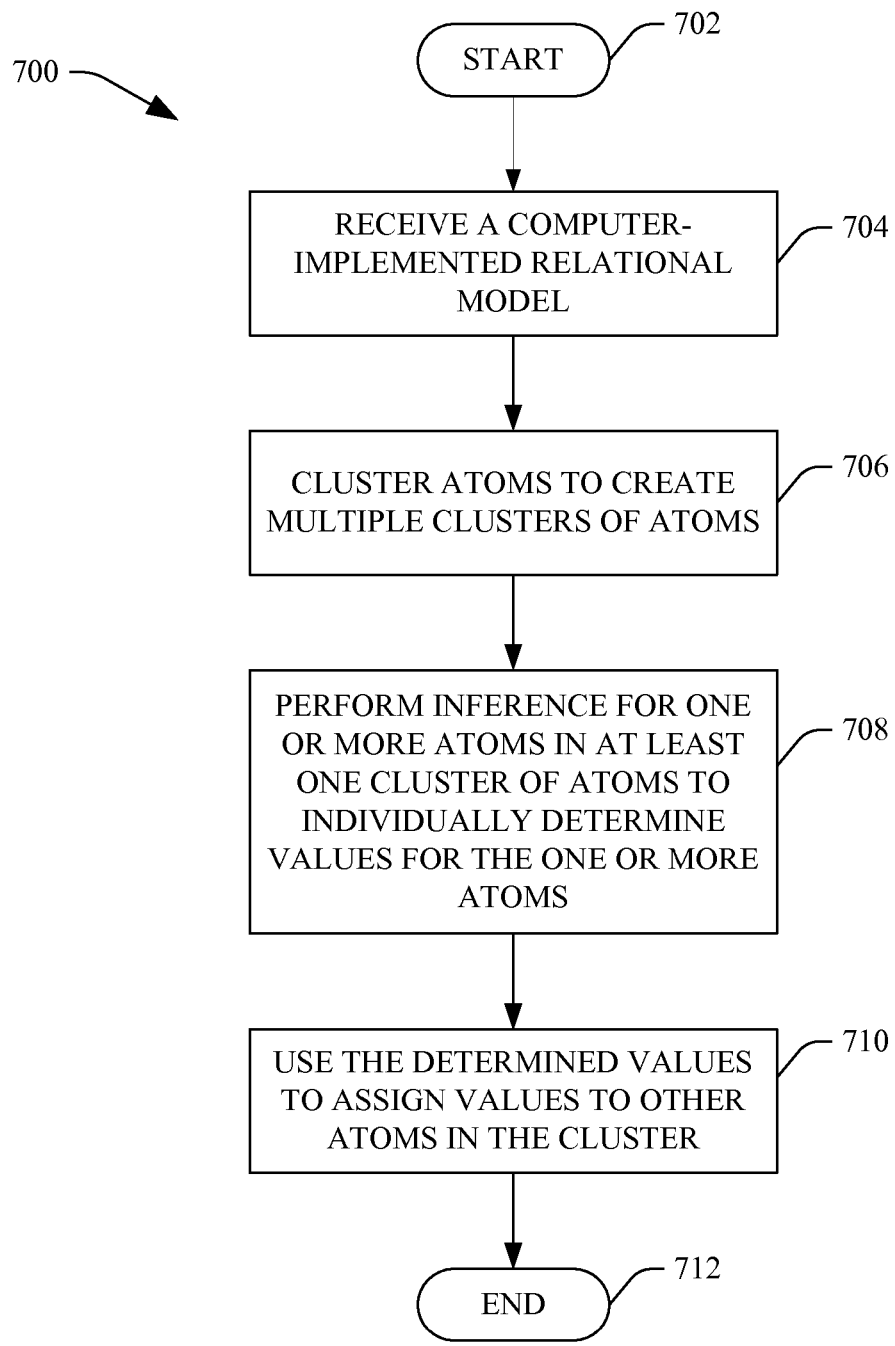
FIG. 7 is a flow diagram that illustrates an example methodology for assigning values to atoms in a relational model.

Referring now to FIG. 7, a methodology 700 for clustering atoms in a relational model and assigning values to atoms in the relational model is illustrated. The methodology 700 starts at 702, and at 704 a computer-implemented relational model is received. At 706, atoms of the relational model are clustered to create multiple clusters of atoms. For example, as described above, atoms that are assigned a substantially similar signature can be clustered together.

At 708, inference is performed on one or more atoms in at least one of the multiple clusters, and values (e.g., probabilities) are individually determined for each of the one or more atoms. In an example, a value assigned to an atom may be a probability that the atom should be assigned a value of "true". At 710, the computed value(s) are used to assign values to other atoms in the at least one cluster. Accordingly, inference need not be performed on each node of the cluster. The methodology 700 ends at 712.

Figure 8:
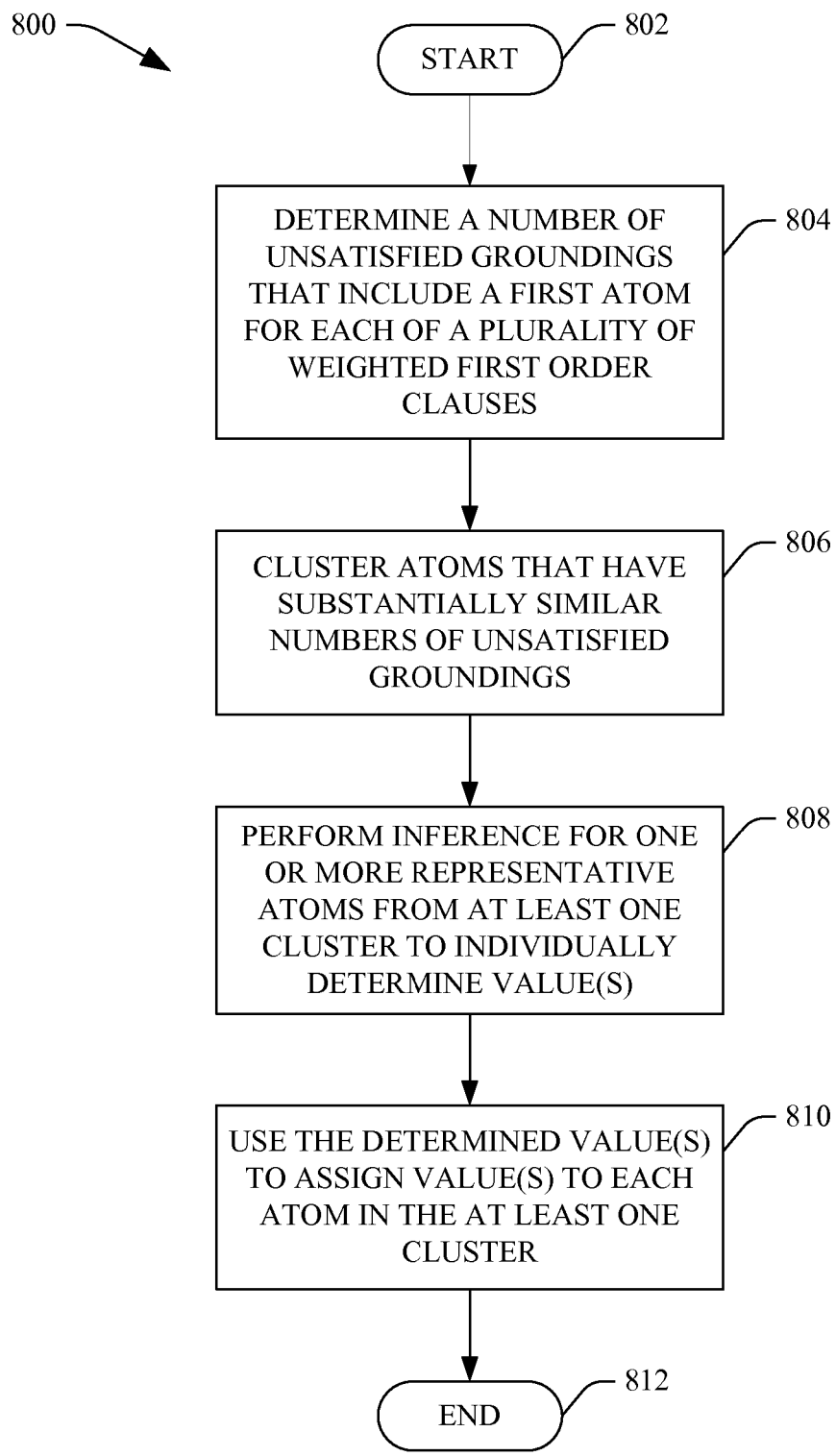
FIG. 8 is a flow diagram that illustrates an example methodology for assigning values to atoms in a relational model.

Turning now to FIG. 8, a methodology 800 that facilitates clustering atoms in a relational model is illustrated. The methodology 800 begins at 802, and at 804 a number of unsatisfied groundings that include a first atom is determined for each of a plurality of weighted first order clauses in the relational model. For instance, the relational model may include three weighted first order clauses. The first atom may be included in two unsatisfied groundings of a first weighted first order clause, zero unsatisfied groundings of a second weighted first order clause, and three unsatisfied groundings of a third weighted first order clause.

At 806, atoms that are included in a substantially similar number of unsatisfied groundings are clustered together. At 808, inference is performed for one or more representative atoms from at least one of the clusters to individually determine a value for each of the one or more atoms, such as probabilities. At 810, the determined value(s) are used to assigned value(s) to each of the atoms in the at least one cluster of atoms. The methodology 800 completes at 812.

Figure 9:
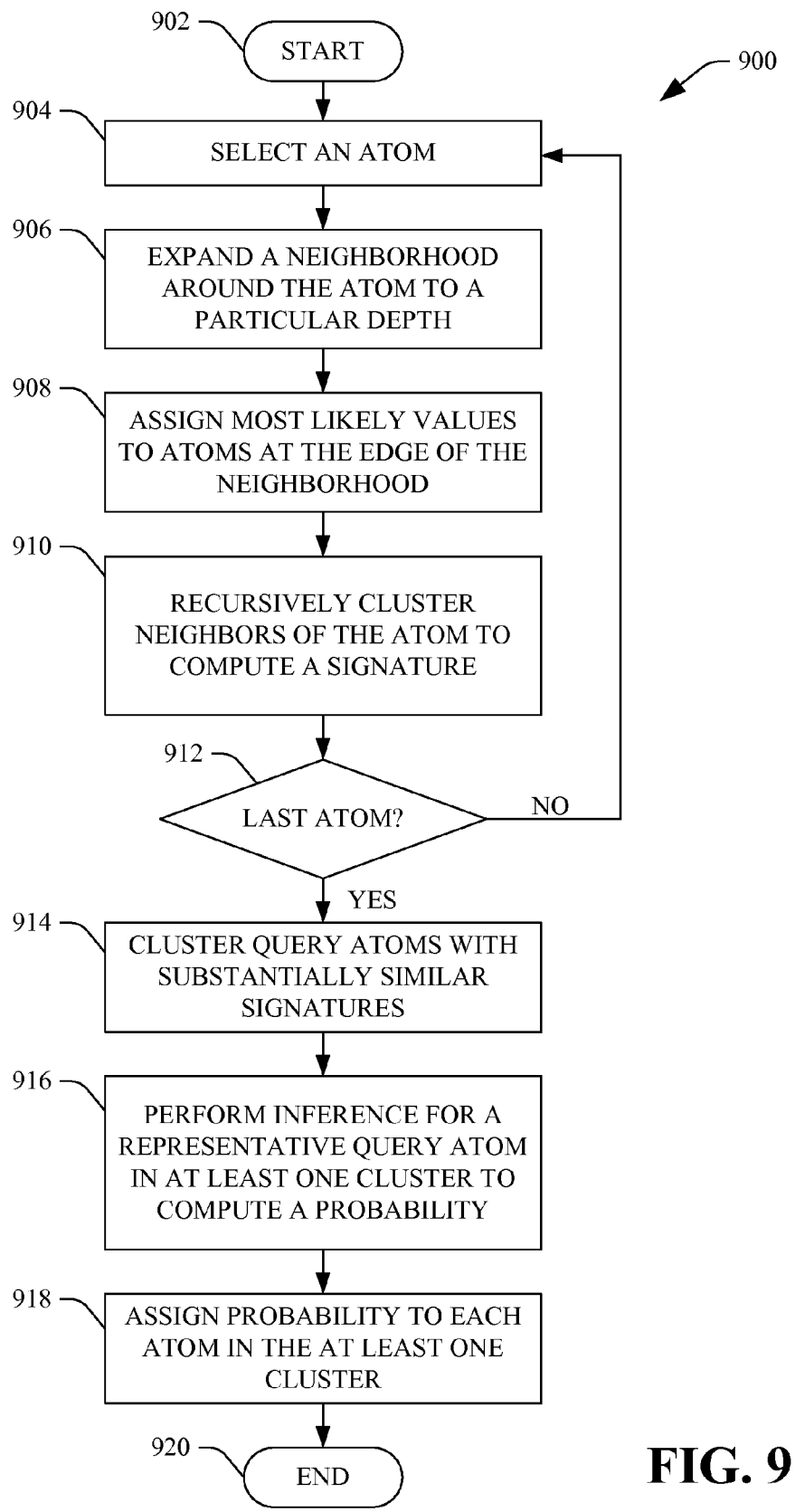
FIG. 9 is a flow diagram that illustrates an example methodology for assigning probabilities to atoms in a relational model.

Turning now to FIG. 9, an example methodology 900 for modifying a relational model to increase efficiency of performing inference over the relational model is illustrated. The methodology 900 starts at 902, and at 904 an atom in the relational model is selected. At 906, a neighborhood around the atom is expanded to a particular depth. Expanding a neighborhood around an atom has been described in detail above. At 908, most likely (or default) values are assigned to atoms at the edge of the neighborhood, effectively creating a sub-network. At 910, neighbors of the selected atom in the sub-network are recursively clustered to compute a signature for the selected atom. At 912, a determination is made regarding whether another atom has yet to be selected. If another atom has yet to be selected, the methodology 900 returns to 904. If all atoms have been selected, atoms with substantially similar signatures are clustered at 914 to create multiple clusters of atoms. At 916, inference is performed for an atom in at least one of the clusters to compute a probability that is assigned to the atom. At 918, the computed probability is assigned to each of the atoms in the at least one cluster. The methodology 900 ends at 920.

Figure 10:
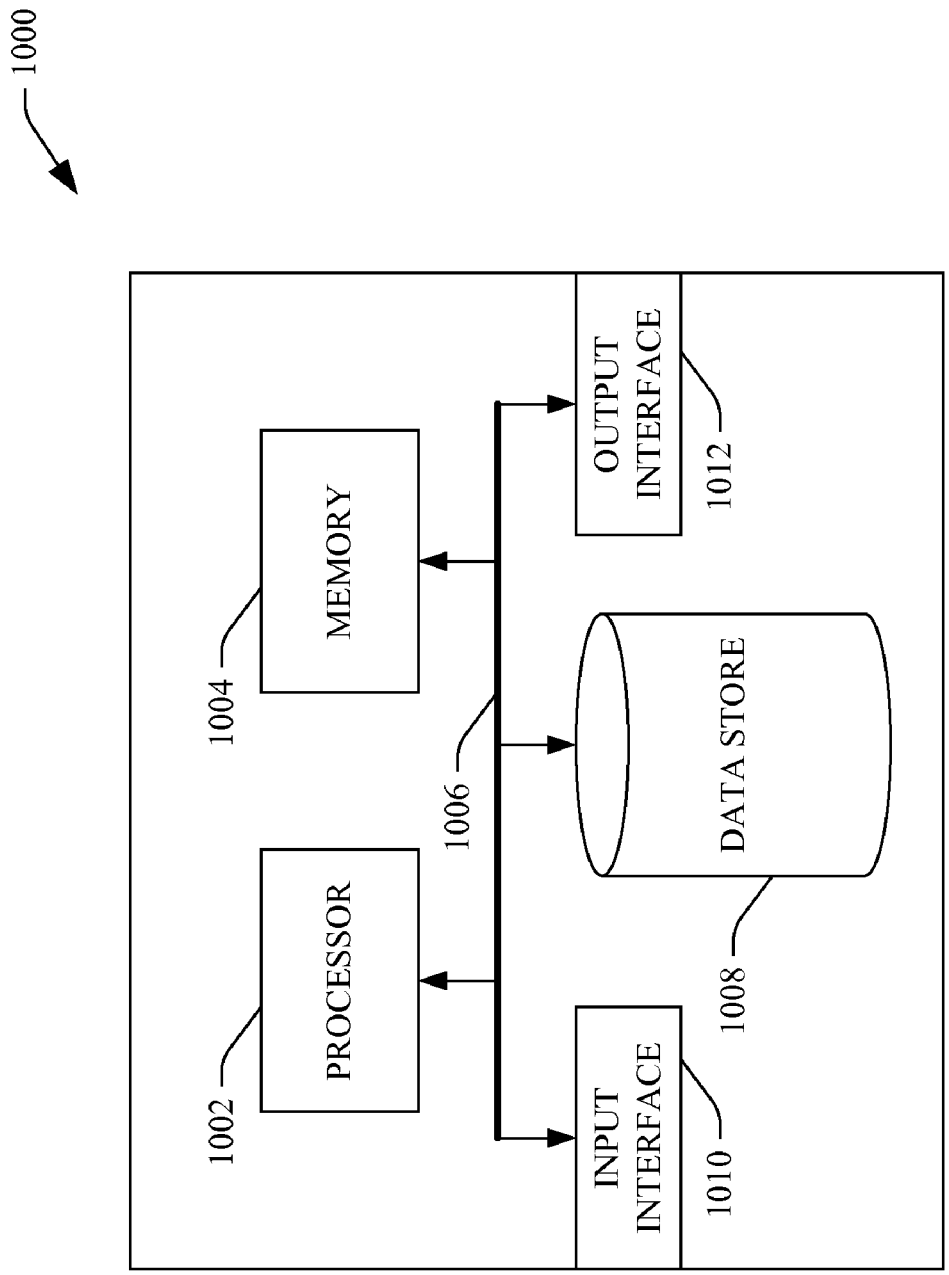
FIG. 10 is an example computing system.

Now referring to FIG. 10, a high-level illustration of an example computing device 1000 that can be used in accordance with the systems and methodologies disclosed herein is illustrated. For instance, the computing device 1000 may be used in a search engine system. In another example, at least a portion of the computing device 1000 may be used in a portable device. The computing device 1000 may be a server, or may be employed in devices that are conventionally thought of as client devices, such as personal computers, personal digital assistants, and the like. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory by way of a system bus 1006. In addition to storing executable instructions, the memory 1004 may also store all or a portion of a relational model, including weighted first order clauses, atoms, etc.

The computing device 1000 additionally includes a data store 1008 that is accessible by the processor 1002 by way of the system bus 1006. The data store 1008 may include executable instructions, all or part of a relational model, inference algorithms, computed probabilities, etc. The computing device 1000 also includes an input interface 1010 that allows external devices to communicate with the computing device 1000. For instance, the input interface 1010 may be used to receive input from a user by way of a network, requests for an output probability, etc. The computing device 1000 also includes an output interface 1012 that interfaces the computing device 1000 with one or more external devices. For example, the computing device 1000 may display queries predicted to be of interest to a user by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1200.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving first that that is indicative of an identity of a user; and
   responsive to receiving the first data, using a processor to selectively modify a relational model, wherein the relational model comprises atoms and relationships between atoms.

2. The method of claim 1, wherein using the processor to selectively modify the relational model comprises removing at least one of the atoms or relationships from the relational model.

3. The method of claim 1, wherein the relational model is one of a Markov Logic Network, a probabilistic relational model, a BLOG relational model, a structural logistic regression relational model, a relational dependency network, or a probabilistic entity relationship model.

4. The method of claim 1, wherein the relationships include weighted first order clauses.

5. The method of claim 1, wherein using the processor to selectively modify the relational model comprises:
   performing inference over a first atom in the relational model to determine a probability corresponding to the first atom in the relational model; and
   assigning the probability corresponding to the first atom in the relational model to a second atom in the relational model without performing inference over the second atom of the relational model.

6. The method of claim 1, further comprising:
   subsequent to selectively modifying the relational model, utilizing the relational model to output a query to the user that is believed to be of interest to the user.

7. The method of claim 1, further comprising:
   clustering atoms of the relational model to create multiple clusters of atoms;
   performing inference on an atom in at least one of the multiple clusters to compute a value; and
   using the computed value to assign probability value to another atom in the at least one cluster.

8. The method of claim 1, wherein using the processor to selectively modify the relational model comprises:
   performing inference over a plurality of atoms in the relational model, such that each atom in the plurality of atoms is assigned a respective value;
   determining a distribution of values with respect to the plurality of atoms; and
   assigning a value to at least one other atom in the relational model based at least in part upon the distribution of values with respect to the plurality of atoms.

9. The method of claim 1, wherein the relationships are weighted first order clauses, and wherein using the processor to selectively modify the relational model comprises:
   using the processor to determine a number of unsatisfied groundings that include a first atom for each of the weighted first order clauses;
   clustering atoms that have substantially similar numbers of unsatisfied groundings for each of the weighted first order clauses;
   performing inference on a representative atom from at least one cluster to determine a probability; and
   assigning the determined probability to other members of cluster.

10. The method of claim 1, wherein using the processor to selectively modify the relational model comprises:

selecting an atom in the relational model;
expanding a neighborhood around the selected atom to a particular depth;
assigning most likely values to atoms at the edge of the neighborhood; and
recursively clustering the neighbors of the atoms to compute a signature for the selected atom.

11. The method of claim 1, wherein using the processor to selectively modify the relational model comprises removing at least one relationship between atoms in the relational model.

12. The method of claim 1, wherein using the processor to selectively modify the relational model comprises:
computing signatures for atoms in the relational model;
clustering atoms in the relational model based at least in part upon the signatures; and
assigning substantially similar values to atoms that reside in a cluster.

13. A computer-implemented system, comprising:
a relational model that includes a plurality of atoms and a plurality of relationships between atoms; and
a modifier component receives an identity of a user and automatically modifies the relational model based at least in part upon an identity of a user to generate a modified relational model.

14. The system of claim 13, wherein the relational model is a Markov Logic Network.

15. The system of claim 13, wherein the relational model is one of a probabilistic relational model, a BLOG relational model, a structural logistic regression relational model, a relational dependency network, or a probabilistic entity relationship model.

16. The system of claim 13, wherein the modifier component modifies the relational model by selectively removing at least one atom or relationship from the relational model to generate the modified relational model.

17. The system of claim 13, further comprising:
a cluster component that clusters atoms of the relational model to create multiple clusters of atoms;
an inference performer component that performs inference on one or more atoms in at least one of the multiple clusters to individually compute values for the one or more atoms; and
an assigner component that assigns values to other atoms in the at least one cluster based at least in part upon the computed values for the one or more atoms to generate the modified relational model.

18. The system of claim 13, further comprising an output component that performs inference over the modified relational model and outputs an indication of a query that is believed to be of interest to the user upon performing the inference.

19. The system of claim 13, wherein a portable computing device comprises the modified relational model.

20. A computer-readable medium that comprises instructions that, when executed by a processor, cause the processor to perform acts comprising:
receiving a computer-implemented Markov Logic Network that includes a plurality of atoms and a plurality of relationships between atoms, wherein the relationships between atoms are each assigned a weight that is indicative of a strength of relationship between atoms coupled by the relationships;
receiving an identity of a user; and
selectively modifying the Markov Logic Network based at least in part upon the identity of the user, wherein selectively modifying the Markov Logic Network comprises:
clustering atoms to create multiple clusters of atoms;
performing inference for an atom in at least one cluster of atoms to determine a value for the atom; and
assigning the value for the atom to each atom in the at least one cluster of atoms.

* * * * *